US009417061B2

(12) United States Patent  
Cha

(10) Patent No.: US 9,417,061 B2  
(45) Date of Patent: Aug. 16, 2016

(54) RANGE FINDER WITH IMAGE SPLIT PRISM FOR GOLF COURSE HOLE

(71) Applicant: Jung Won Cha, Seoul (KR)

(72) Inventor: Jung Won Cha, Seoul (KR)

( * ) Notice: Subject to any disclaimer, the term of this patent is extended or adjusted under 35 U.S.C. 154(b) by 12 days.

(21) Appl. No.: 14/377,177

(22) PCT Filed: Feb. 5, 2013

(86) PCT No.: PCT/KR2013/000901  
§ 371 (c)(1),  
(2) Date: Aug. 7, 2014

(87) PCT Pub. No.: WO2013/119012  
PCT Pub. Date: Aug. 15, 2013

(65) Prior Publication Data  
US 2016/0018221 A1  Jan. 21, 2016

(30) Foreign Application Priority Data

Feb. 7, 2012 (KR) .................. 10-2012-0012485  
Jan. 31, 2013 (KR) .................. 10-2013-0010765

(51) Int. Cl.  
*G02B 23/06* (2006.01)  
*A63B 71/06* (2006.01)  
*G01C 3/04* (2006.01)

(52) U.S. Cl.  
CPC .............. *G01C 3/04* (2013.01); *A63B 71/0619* (2013.01)

(58) Field of Classification Search  
CPC ............ G01C 3/04; G01C 3/20; G02B 23/02; G02B 23/06; G02B 5/04; A63B 71/0619  
USPC ................... 359/422, 432; 356/6–9, 19, 22  
See application file for complete search history.

(56) References Cited

U.S. PATENT DOCUMENTS

| 2,341,410 | A |   | 2/1944  | Mihalyi |           |
|-----------|---|---|---------|---------|-----------|
| 2,969,706 | A |   | 1/1961  | Rosier et al. | |
| 3,299,768 | A | * | 1/1967  | Alvarez ................ | G01C 3/22 356/22 |
| 3,322,022 | A | * | 5/1967  | Wood ................ | G01C 3/22 356/22 |
| 3,720,467 | A | * | 3/1973  | Strong ................ | G01C 3/00 356/3 |
| 5,020,902 | A | * | 6/1991  | Kits van Heyningen | G01C 3/32 356/21 |
| 5,311,271 | A |   | 5/1994  | Hurt et al. | |
| 6,636,296 | B1 |   | 10/2003 | Faulkner et al. | |
| 8,314,923 | B2 | * | 11/2012 | York ................ | A63B 71/06 356/4.01 |
| 2010/0220309 | A1 | * | 9/2010 | Zhu ................ | G01C 3/08 356/4.01 |

FOREIGN PATENT DOCUMENTS

CN    2434636 Y    6/2001  
JP   51-001063 U   1/1976

(Continued)

*Primary Examiner* — Frank Font  
(74) *Attorney, Agent, or Firm* — Revolution IP, PLLC

(57) ABSTRACT

Disclosed is a rangefinder comprising: a housing shaped like a cylinder and opened frontward and backward; an object lens comprising one or more lenses arranged in a front end portion of the housing and facing an object targeted for distance measurement; a display providing a user with an image from the object lens; an image split prism arranged in between the object lens and the display, making the image from the object lens be split and focused, and installed movably along an optical axis within the housing so that a space between split images can be adjusted; and a distance indicator indicating distance from the targeted object in accordance with positions of the image split prism, in a state that the position of the image split prism is adjusted to set up the space between the split images to a reference position.

19 Claims, 9 Drawing Sheets

(56) References Cited

FOREIGN PATENT DOCUMENTS

| | | |
|---|---|---|
| JP | 55-041821 U | 3/1980 |
| JP | 56-083848 A | 7/1981 |
| JP | 05-215987 A | 8/1993 |
| JP | 09-145361 A | 6/1997 |
| JP | 11-173848 A | 7/1999 |
| KR | 10-1996-0008275 A | 3/1996 |
| KR | 20-2000-0010420 U | 6/2000 |
| KR | 10-2001-0084094 A | 9/2001 |
| KR | 20-0259778 Y1 | 1/2002 |
| KR | 10-2009-0112384 A | 10/2009 |
| KR | 2001-0084094 A | 9/2011 |
| KR | 20-0457379 Y1 | 12/2011 |

\* cited by examiner (a)　　　　　　　　　　　(b)

RANGE FINDER WITH IMAGE SPLIT PRISM FOR GOLF COURSE HOLE

CROSS REFERENCE TO PRIOR APPLICATIONS

This application is a National Stage Application of PCT International Patent Application No. PCT/KR2013/000901 filed on Feb. 5, 2013, under 35 U.S.C. §371, which claims priority to Korean Patent Application Nos. 10-2012-0012485 filed on Feb. 7, 2012 and 10-2013-0010765 filed on Jan. 31, 2013, which are all hereby incorporated by reference in their entirety.

BACKGROUND

The present invention relates to a rangefinder with an image split prism for a golf course hole, and more particularly to a golf rangefinder capable of conveniently and precisely measuring distance from a target such as a flagstick or a flag in hole through a telescope.

In general, golf is a game in which a golfer checks a distance from a hole and uses a golf club corresponding to his/her own hit distance to hit a ball into the hole with a minimum number of strokes.

At this time, a flagstick having a height of about 2.2 m is in the hole so that a golfer can easily check a distance, a direction, etc. from the hole.

Thus, a technique of measuring a distance based on a general flagstick has been published in Korean Utility Model No. 91-2959, titled 'Rangefinder for Golf Flagstick,' which is as follows.

In the conventional range finder, an upper case and a lower case are separately provided and assembled into a main body, holders and supporters are internally protruded from one side of the lower case having one surface formed with a see-through hole, a reflection mirror and a prism mirror are respectively adhered and fixed to the opposite holders, a convex mirror and transparent glass are in closely-contact with and inserted in the supporters, and a transparent microfilm having gradations and baseline numerals is attached to one side of the transparent glass.

However, the foregoing conventional configuration is to align an image of the flagstick with the baseline marked for measuring a distance. As the distance gets longer, the gradations become more compact. Therefore, an error is too large to compare the gradations with the flagstick seen faintly at a long distance, and thus it may be impossible to measure the distance.

To solve these problems, the telescope shown in FIG. 1 may be combined with the reticle 40 having the gradations and the baseline numerals. However, the image is susceptible to hand vibration or the like movement in accordance with magnifications of the telescope, and it is thus difficult to read the gradations corresponding to the size of flagstick.

That is, if the telescope is used as disclosed in Korean Patent Publication No. 10-2001-0084094, the hand vibration or body movement causes a shake of the image to be increased in proportion to the magnification of the telescope, and it is thus difficult to read the gradation by aligning the fixed gradations with the shaking image, thereby decreasing utilization of the range finder due to low accuracy in distance measurement and inconvenience in use.

Meanwhile, a laser rangefinder for measuring a distance based on a laser beam reflected from the flagstick is expensive, whereas it shows high accuracy. Also, a global positioning system (GPS) rangefinder for measuring a distance between a golfer and the center or edge of a green just estimates a distance from the flagstick and has to be inconveniently consistently upgraded.

Accordingly, there is a need of developing a golf rangefinder that is not only inexpensive but also shows high accuracy in distance measurement.

SUMMARY

Accordingly, the present invention is conceived to solve the forgoing problems, and an aspect of the present invention is to provide a rangefinder with an image split prism for a golf course hole, in which an image split prism arranged in between an object lens and an eyepiece is used to split an image into two images, and thus the two images are moved together as if they are joined when a housing is shaken by vibration, thereby accurately measuring a distance from the flagstick even though hand vibration or the like vibration is generated.

Also, an aspect of the present invention is to provide a rangefinder with an image split prism for a golf course hole, in which inconvenience in measurement due to hand vibration is reduced to thereby employ a high magnification telescope or zoom-lens.

One aspect of the present invention provides a rangefinder with an image split prism for a golf course hole, the rangefinder comprising: a housing shaped like a cylinder and opened frontward and backward; an object lens comprising one or more lenses arranged in a front end portion of the housing and facing an object targeted for distance measurement; a display providing a user with an image from the object lens; an image split prism arranged in between the object lens and the display, making the image from the object lens be split and focused, and installed movably along an optical axis within the housing so that a space between split images can be adjusted; and a distance indicator indicating distance from the targeted object in accordance with positions of the image split prism, in a state that the position of the image split prism is adjusted to set up the space between the split images to a reference position.

The display may comprise an eyepiece comprising one or more lenses arranged in a back end portion of the housing so that an image at the object lens can be focused on a retina.

The object lens or the eyepiece may comprise a zoom lens.

The display may comprise an imaging device provided at a position where an image from the object lens is focused, and an image output section provided in the back of the housing and outputting an image acquired by the imaging device.

At least one side of the image split prism may comprise inclined surfaces respectively having different inclines opposed to each other at upper and lower portions with respect to an optical axis.

The image split prism may be spaced apart from the optical axis between the object lens and the eyepiece, and a plurality of reflective mirrors may guide an image in a center region to pass through the image split prism.

The image split prism may comprise an inclined surface at an upper or lower portion on at least one side with respect to the optical axis.

The image split prism may comprise a flat surface causing no refraction at an opposite portion of the optical axis on both sides, without the inclined surface.

The image split prism may be spaced apart from the optical axis between the object lens and the eyepiece, and a plurality of reflective mirrors may guide an image in a center region to pass through the image split prism.

The image split prism may comprise three or more inclined surfaces formed by alternating two inclined surfaces different in incline on at least one side.

The image split prism may be spaced apart from the optical axis between the object lens and the eyepiece, and a plurality of reflective mirrors may guide an image in a center region to pass through the image split prism.

The rangefinder may further comprise an adjustment ring rotatably coupled to the housing and moving the image split prim along the optical axis.

Gradations of the distance indicator may be formed on one outer circumferential surface of contact surfaces between the housing and the adjustment ring, and a reference baseline for indicating the gradation may be formed on the other circumferential surface.

The distance indicator may comprise a micro graduated ruler marked with the gradations and arranged inside the housing to move in association with the image split prism, a focal distance compensation lens adjacent to the micro graduated ruler, and a reflective prism or mirror arranged in between the focal distance compensation lens and the eyepiece.

The rangefinder may further comprise a reticle placed in front of the display so that two images split by the image split prism can be focused thereon.

The reticle may be formed with a reference mark, and the eyepiece may be arranged movably along the optical axis so that a user can control vision based on his/her eyesight through the reference mark.

The object lens may be arranged movably along the optical axis so that focus of an image formed on the reticle can be adjusted in accordance with distances from the object targeted for distance measurement.

An erecting prism for erecting an image may be arranged in front or back of the image split prism or in back of the eyepiece or in front of the object lens.

The gradations of the distance indicator corresponding to distances from the targeted object may satisfy the following expression for calculating a distance from an image focusing surface to the image split prism:

$$x = yf'/s\{|\tan(A_1(n-1)) \pm \tan(A_2(n-1))|\}$$

(where, y: the height of flagstick, s: a distance from the object lens to a flagstick, x: a distance from the image focusing surface to the image split prism, $A_1$: an absolute value of an upper vertical angle of the image split prism, $A_2$: an absolute value of a lower vertical angle of the image split prism, f': a focal distance of the object lens, n: a refractive index of the image split prism, and ±: + is selected when the upper and lower vertical angles of the image split prism are in the opposite direction, and − is selected when they are in the same direction).

According to an exemplary embodiment, there is provided a rangefinder with an image split prism for a golf course hole, in which an image split prism arranged in between an object lens and an eyepiece is used to split an image into two images, and thus the two images are moved together as if they are joined when a housing is shaken by vibration, thereby accurately measuring a distance from the flagstick even though hand vibration or the like vibration is generated.

DETAILED DESCRIPTION

Prior to description, like numerals will refer to like elements through many exemplary embodiments, which are representatively described in a first embodiment, and the other exemplary embodiments describe only different configurations.

Below, a rangefinder with an image split prism for a golf course hole according to a first embodiment of the present invention will be described with reference to accompanying drawings.

Figure 1:
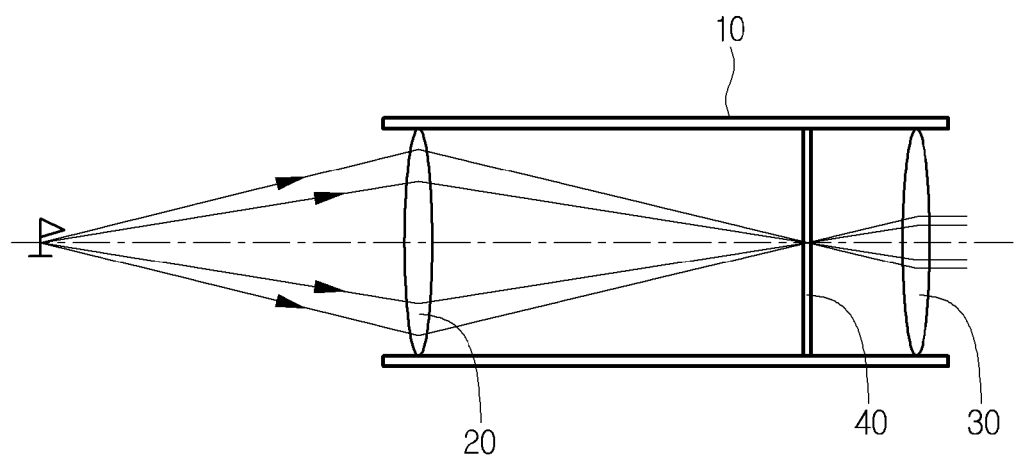
FIG. 1 is a cross-section view showing a configuration of a conventional optical golf rangefinder.
Figure 2:
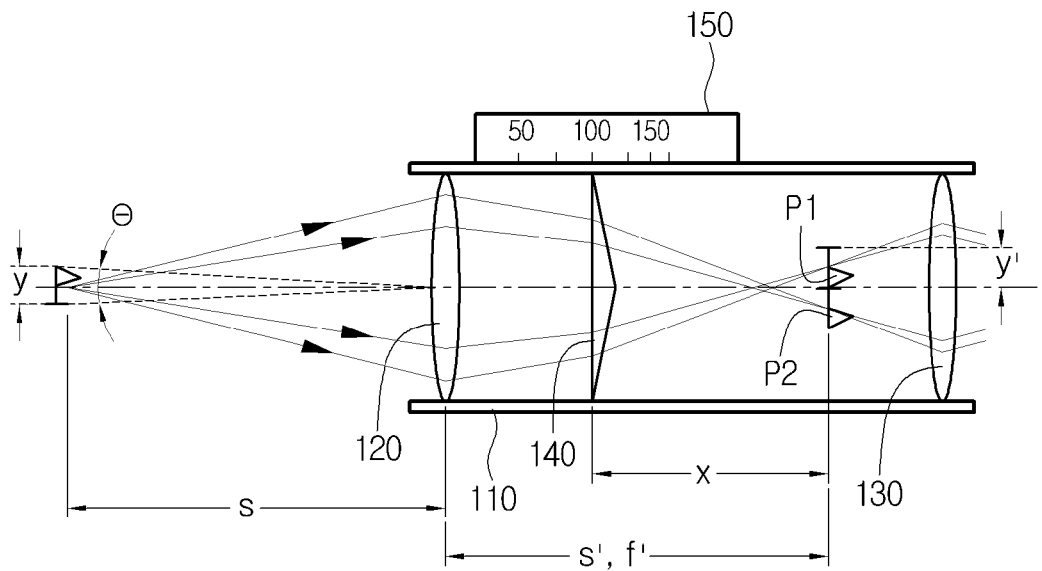
FIG. 2 is a cross-section view showing a configuration of a rangefinder with an image split prism for a golf course hole according to a first embodiment of the present invention.
Figure 3:
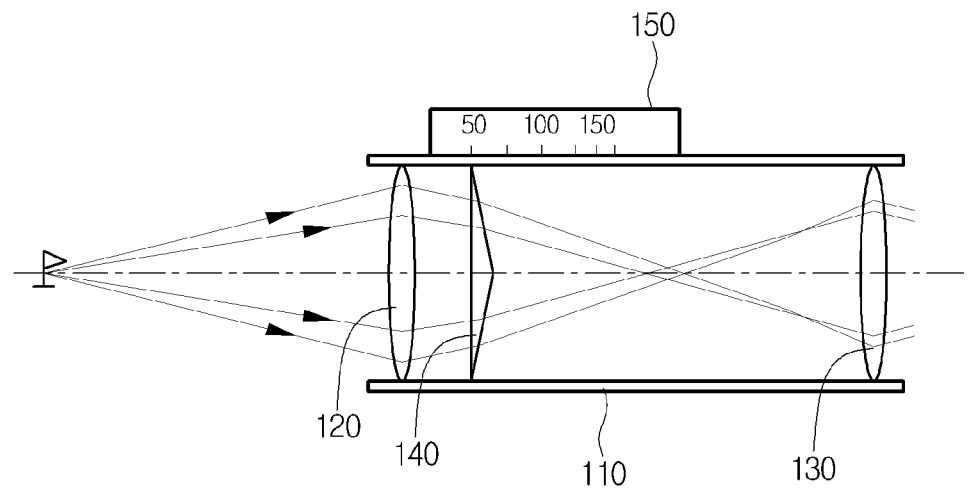
FIGS. 3 to 4 are cross-section views showing operations of the rangefinder with the image split prism for the golf course hole according to the first embodiment of the present invention.
Figure 4:
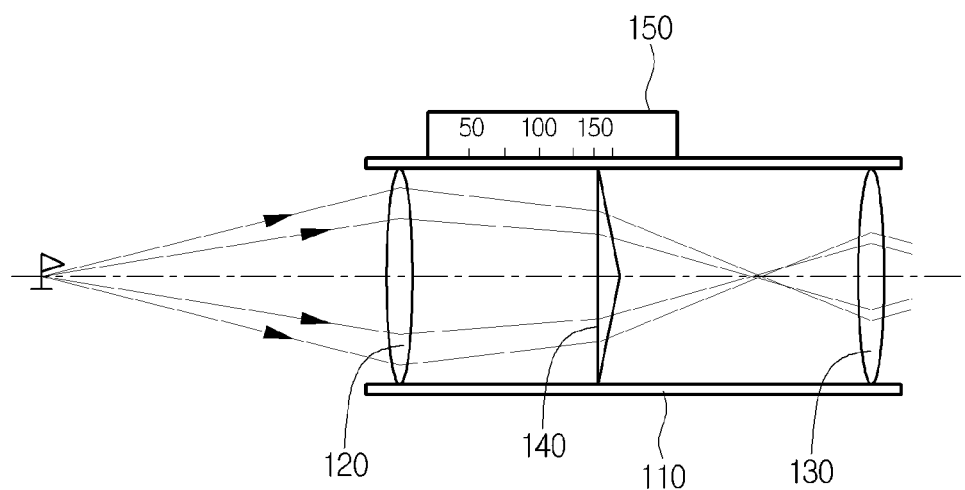

Among the accompanying drawings, FIG. 2 is a cross-section view showing a configuration of a rangefinder with an image split prism for a golf course hole according to a first embodiment of the present invention, and FIGS. 3 to 4 are cross-section views showing operations of the rangefinder with the image split prism for the golf course hole according to the first embodiment of the present invention.

As shown in FIG. 2, the rangefinder with the image split prism for the golf course hole according to the first embodiment of the present invention includes a housing 110, an object lens 120, a display, an image split prism 140, and a distance indicator 150.

The housing 110 is achieved by a cylindrical body opened frontward and backward. The object lens 120 includes one or more lenses arranged in a front end portion of the housing 110 and facing a flagstick. The eyepiece 130 forming the display includes one or more lenses and is arranged in a back end portion of the housing 110 so that an image at the object lens 120 can be focused on a retina.

The image split prism 140 refers to an optical element having an optical medium that splits a path of rays into two directions in a middle portion where the rays starting from an external object and passing through the object lens travel to an image focusing surface of the object lens, so that an image can be split into two images and focused on the image focusing surface of the object lens.

Here, the image split prism 140 may include a biprism; an asymmetric-biprism where an upper portion and a lower portion are different in a vertical angle from each other; a modified-biprism where four inclined surfaces, i.e., upper, lower, front and back inclined surfaces divided with respect to an optical axis are formed to have various inclines for modification of the biprism, and at least one between the front and back surfaces of the prism includes inclined surfaces (including a vertical surface) different in incline between the upper and lower portions with respect to the optical axis; a half-prism where only one of the upper portion and the lower portion of the biprism or the modified-biprism is used; a multilayer-biprism where three or more inclined surfaces (this embodiment is described based on an assumption that the image split prism consists of eight inclined surfaces) different in incline are alternately formed on at least one surface; etc. Here, the biprism and the asymmetric-biprism may be regarded as a kind of modified-biprism, and the multilayer-biprism may involve the multilayer-biprism, a multilayer-asymmetric-biprism and a multilayer-modified-biprism.

Also, the image split prism 140 may be replaced by a Fresnel prism in order to make the prism thin, and this can be achieved by anyone who has an ordinary skill in the art. Therefore, it will be appreciated that the image split prism employing the Fresnel prism is also involved within the scope of the appended claims.

In this embodiment, the image split prism 140 includes the biprism which has an incident surface formed with a flat surface and an exit surface formed with inclined surfaces having inclines opposed to each other at the upper and lower portions with respect to the optical axis so that one image provided from the object lens 120 can be split into two images P1 and P2 and focused. The image split prism 140 is movably installed in a direction of the optical axis on an optical path between the object lens 120 and the eyepiece 130.

The distance indicator 150 is placed at the outside of the housing 110 in the direction of the optical axis and marked with gradations 151 for indicating distances from the flagstick based on a position of the image split prism 140, in the state that two images P1 and P2 split by the image split prism 140 reach a predetermined 'reference position (at which a bottom of the upper image P1 and a top of the lower image P2 in this embodiment meet with each other)' as the image split prism 140 moves in the direction of the optical axis.

Meanwhile, a display window (not shown), through which the image split prism 140 is observed in the housing 110 in order to show the position of the housing 110, may be arranged in parallel with the distance indicator 150, or a reference baseline 152 connected to the image split prism 140 may penetrate the housing 110 and indicate the gradation 151 of the distance indicator 150.

Below, operations of the rangefinder with the image split prism for the golf course hole according to the first embodiment will be described with reference to FIGS. 2 to 4.

Figure 5:
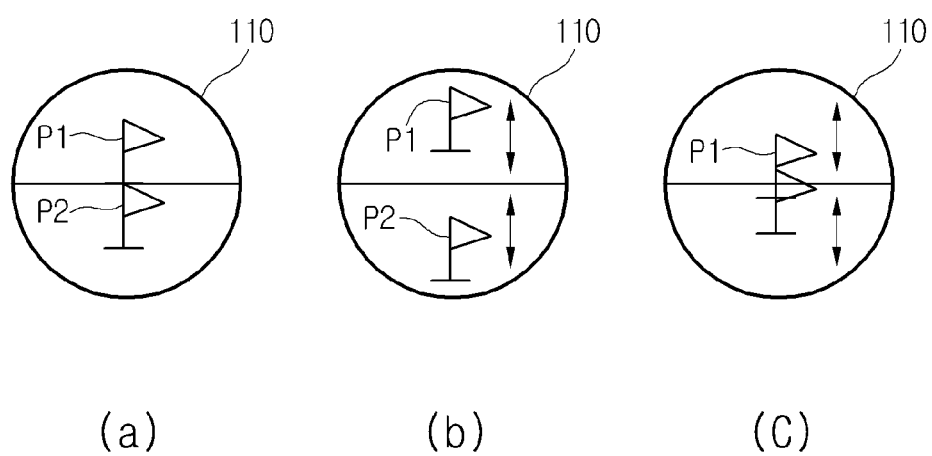
FIG. 5 is a view showing observed images corresponding to the operations of the rangefinder with the image split prism for the golf course hole according to the first embodiment of the present invention.

In FIG. 5, (a) shows the images observed on the eyepiece of FIG. 2, in which two images P1 and P2 split by the image split prism 140, i.e., the bottom of the upper image P1 and the top of the lower image P2 meet with each other and thus determined as the reference position. In this state, the position of the image split prism 140 is determined as shown in FIG. 2, and thus an observer can read the gradation corresponding to the image split prism 140 among the gradations 151 of the distance indicator 150 provided in the outside of the housing 110 to thereby measure the distance from the flagstick. Accordingly, it is possible to get a precise measuring result through simple operations.

Meanwhile, operations of moving two images P1 and P2 to the reference position by adjusting the position of the image split prism 140 are as follows.

First, FIG. 3 shows that the image split prism 140 is moved from a proper position toward the object lens 120 on the assumption that the flagstick is positioned at the same distance as that of FIG. 2. In this state, the positions where two images P1 and P2 split by the image split prism 140 are focused are moved in a direction of separating from each other (see (b) of FIG. 5). That is, if two images P1 and P2 split by the image split prism 140 are observed as shown in (b) of FIG. 5 while an observer sees the flagstick through the housing 110, the image split prism 140 is moved in a direction of moving away from the object lens 120 so that two images P1 and P2 can reach the reference position as shown in (a) of FIG. 5.

Likewise, FIG. 4 shows that the image split prism 140 is moved from the proper position toward the eyepiece 130, in which the positions where two images P1 and P2 split by the image split prism 140 are focused are moved in a direction of overlapping with each other (refer to (c) of FIG. 5). In this state, the image split prism 140 is moved toward the object lens 120 so that a space between two images P1 and P2 can become wider, thereby reaching the reference position as shown in (a) of FIG. 5.

Therefore, in the state that the object lens 120 is collimated to face toward the flagstick, if two images P1 and P2 observed through the eyepiece 130 are spaced apart from each other, the image split prism 140 is moved toward the eyepiece 130. On the other hand, if two images P1 and P2 are overlapped with each other, the image split prism 140 is moved toward the object lens 120 so that the bottom of the upper image P1 and the top of the lower image P2 can meet with each other, i.e., be adjusted to be in the reference position, thereby measuring the distance from the flagstick by reading the gradation of the distance indicator 150 placed corresponding to the position of the image split prism 140

In other words, in a case where the flagstick is observed through a magnified image, the image is shaken by hand vibration or the like vibration. On the contrary, two images P1 and P2 in this embodiment are moved together as they are joined, and it is thus easy to set up two images P1 and P2 to be in the reference position even when the hand vibration or the like vibration is generated. Further, the gradation provided on the outside of the housing 110 is read when the reference position is completely set up, and it is thus not only easy to read the gradation but also precisely measure the distance from the flagstick.

Accordingly, it is possible to measure the distance regardless of the hand vibration even though an image is greatly shaken in the conventional golf rangefinder using the telescope or when the high magnification telescope or zoom lens is employed, thereby not only extending a measurable distance but also quickly, easily and accurately measuring the distance from the flagstick.

In the meantime, an expression of calculating a position on the gradations for measuring the distance may be established as follows. If symbols are defined as follows (y: the height of flagstick, y': the size of image focused on the image focusing surface, s: a distance from the object lens to the flagstick, s': a distance from the objective lens 120 to the image focusing surface, x: a distance from the image focusing surface to the image split prism 140, $A_1$: an absolute value of an upper vertical angle of the image split prism 140, $A_2$: an absolute value of a lower vertical angle of the image split prism 140, $\delta_{1min}$: the minimum deflection angle of rays passing through the upper portion of the image split prism 140, $\delta_{2min}$: the minimum deflection angle of rays passing through the lower portion of the image split prism 140, θ: a view angle of viewing both ends of the flagstick, f': a focal distance of the object lens 120, and n: a refractive index of the image split prism 140), $$\tan\theta = y/s = y'/s' = y'/f' \quad \text{(Expression 1)}$$

Therefore, the size of image focused on the image focusing surface, i.e., y' is calculated as follows.

$$y' = yf'/s \quad \text{(Expression 2)}$$

Since the vertical angle (i.e., the apex angle) of the image split prism of the image split prism 140 is small, an angle deflected by the image split prism 140 can be approximated by the minimum deflection angle as follows.

$$\delta_{1min} = A_1(n-1), \delta_{2min} = A_2(n-1) \quad \text{(Expression 3)}$$

The proper position is obtained when the sum (when the upper and lower vertical angles of the image split prism are in the opposite direction) or the difference (when the upper and lower vertical angles of the image split prism are in the same direction) of deviations of two rays respectively passing through the lower portion and the upper portion of the image split prism 140 and deviated upward and downward from the image focusing surface becomes y'.

Therefore, x of when the following expression 4 is satisfied shows the proper position of the prism.

$$|\tan(\delta_{1min}) \pm \tan(\delta_{2min})| = y'/x \quad \text{(Expression 4)}$$

The expression 4 is represented again as follows.

$$x = y'/|\tan(\delta_{1min}) \pm \tan(\delta_{2min})| \quad \text{(Expression 5)}$$

If the expressions 2 and 3 are substituted into the expression 5, the following expression is obtained.

$$x = yf'/s\{|\tan(A_1(n-1)) \pm \tan(A_2(n-1))|\} \quad \text{(Expression 6)}$$

(where, ± refers to that + is selected when the upper and lower vertical angles of the image split prism are in the opposite direction, and − is selected when they are in the same direction).

Therefore, the proper position of the image split prism 140 for measuring the distance from the flagstick, i.e., s can be represented by x, i.e., the distance from the image focusing surface to the image split prism 140 as shown in the expression 6. Accordingly, it is possible to make the gradations for measuring the distance from the object as shown in FIG. 2 based on the expression 6.

That is, if the gradations 151 of the distance indicator 150 are made based on the expression 6, they are as shown in the following [table 1].

Here, if the flagstick is placed at a distance s(m), the proper position from the position of the image to the image split prism 140 is represented by x(mm). Thus, the gradations can be manufactured based on the following [table 1].

TABLE 1

| $S_{(m)}$ | $X_{(mm)}$ |
|---|---|
| 50 | 84.01 |
| 60 | 70.01 |
| 70 | 60.01 |
| 80 | 52.51 |
| 90 | 46.68 |
| 100 | 42.01 |
| 110 | 38.19 |

TABLE 1-continued

| $S_{(m)}$ | $X_{(mm)}$ |
|---|---|
| 120 | 35.01 |
| 130 | 32.31 |
| 140 | 30.01 |
| 150 | 28.01 |
| 160 | 26.25 |
| 170 | 24.71 |
| 180 | 23.34 |
| 190 | 22.11 |
| 200 | 21.00 |
| 210 | 20.00 |

(where, it is assumed that the height of the flagstick is y=2.2 m, the focal distance of the object lens 120 is f'=10 cm, the upper vertical angle of the image split prism 140 is $A_1$=3°, the lower vertical angle of the image split prism 140 is $A_2$=3°, and the refractive index of the image split prism 140 is n=1.50).

Here, a part of the flagstick protruding from the ground generally has a height ranging from 2.1 m to 2.3 m, and a proper height of the flagstick may be selected as the reference within this range. In this embodiment, an average height of 2.2 m was used as an example of the reference. Also, for the sake of more accurate measurement, the upper portion or lower portion of the flagstick may be marked with stripes of noticeable color at regular intervals or attached with a predetermined-sized label, so that an error due to difference in height of the flagstick can be reduced, thereby measuring the distance more precisely. Further, for the sake of more convenient measurement, instead of the flagstick, the size of flag attached to the flagstick may be used for measuring the distance. In this embodiment, a lens having a positive refractive index is used for the eyepiece refers, but not limited thereto. Alternatively, a lens having a negative refractive index may have the same effect as that having the positive refractive index.

Next, alternative embodiments of the rangefinder with the image split prism for the golf course hole according to the first embodiment will be described.

Figure 6:
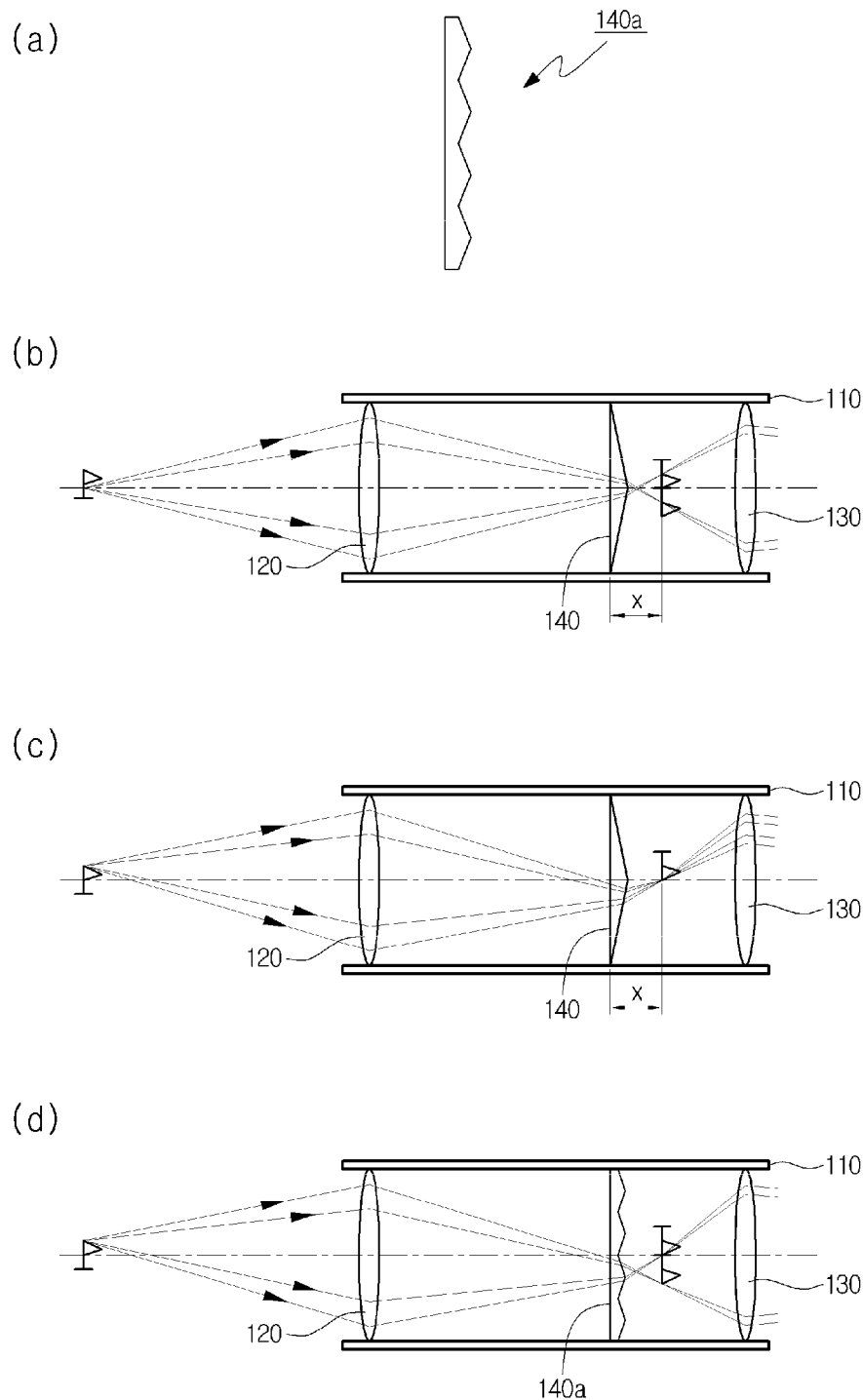
FIGS. 6 to 10 are views showing various alternative examples of the rangefinder with the image split prism for the golf course hole according to the first embodiment of the present invention.
Figure 7:
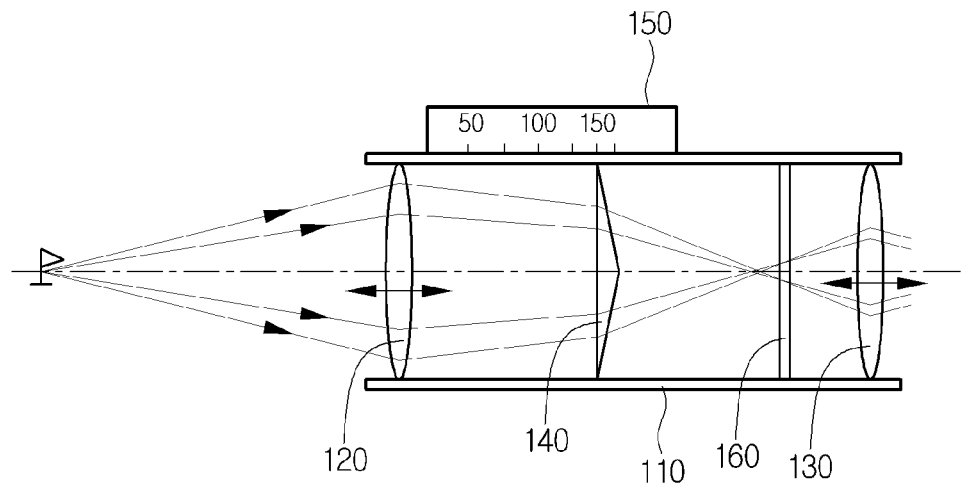

The first alternative embodiment to the first embodiment is different from the first embodiment in that the image split prism 140 of the biprism shown in FIG. 2 is replaced by an image split prism 140a of the multilayer-biprism where three or more inclined surfaces are formed by alternating two inclined surfaces different in incline on at least one surface as shown in (a) of FIG. 6. If the image split prism is close to the object lens 120, there is no serious problem. However, if the image split prism is close to an image on the object lens (i.e., if x becomes shortened), an image corresponding to the middle portion of the flagstick is still split into two as shown in (b) of FIG. 6, but the ray starting from the upper or lower end portion of the flagstick passes only the lower or upper portion of the image split prism as shown in (c) of FIG. 6, thereby showing only one of the upper and lower end portions of the flagstick. Therefore, in a region where x is small, it may be inconvenient to measure the distance since one of the two split flagsticks is clearly seen but the other one is partially seen. To solve this problem, the image split prism 140a of the multilayer-biprism where three or more inclined surfaces are formed by alternating two inclined surfaces different in incline on at least one surface as shown in (a) of FIG. 6 is employed as shown in (d) of FIG. 6, so that the image of the flagstick can be split into two and clearly seen in even a region where x is small on the contrary to that of the first embodiment.

The second alternative embodiment to the first embodiment is different from the first embodiment in that a reticle 160 is arranged in between the eyepiece 130 and the image split prism 140 so that an image of the object lens 120 can be focused thereon, the eyepiece 130 is arranged for fine control along the direction of the optical axis so that an observer can control vision based on his/her eyesight through a reference mark (not shown) formed on the reticle 160, and the object lens 120 is arranged for fine control along the direction of the optical axis so as to compensate for an error of the focal distance due to distances from the flagstick.

That is, the eyepiece 130 is fine-controlled in the direction of the optical axis in accordance with an observer's eyesight so as to set up the reference mark on the reticle 160 to be seen clearly, and then the object lens 120 is fine-controlled in the direction of the optical axis in accordance with errors of the focal distance of the object lens 120 depending on the distance from the flagstick so as to focus a clear image on the reticle 160.

Therefore, two images P1 and P2 split by the image split prism 140 can be seen clearly, and it is thus possible to use the high magnification telescope or zoom lens. Further, the reference position is obtained while observing two clearly focused images P1 and P2, and it is thus possible to precisely measure the distance from the flagstick.

Figure 8:
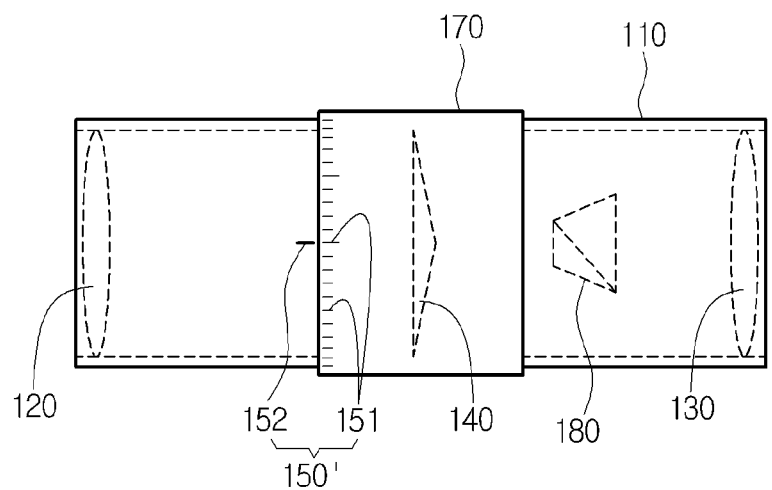

Next, the third alternative embodiment to the first embodiment is different from the first embodiment in that an adjustment ring 170 is additionally provided and rotatably installed in the housing 110 so as to move the image split prism 140 in the direction of the optical axis as shown in FIG. 8, and a distance indicator 150' including the reference baseline 152 and the plurality of gradations 150 on an outer circumferential surface where the housing 110 and the adjustment ring 170 meet with each other.

That is, when the adjustment ring 170 rotatably coupled to the housing 110 is rotated forward or backward, the image split prism 140 arranged in the housing 110 moves in the direction of the optical axis so that the space between two images P1 and P2 split by the image split prism 140 can be adjusted and set up to the reference position. In the state that the reference position is set up, it is possible to measure the distance from the flagstick based on the gradation 151 indicated by the reference baseline 152.

Meanwhile, an erecting prism 180 such as a Schmidt-Pechen Prism may be additionally arranged in a suitable position between the object lens 120 and the eyepiece 130 in order to erect an image in the case where the eyepiece 130 has a positive refractive index.

Figure 9:
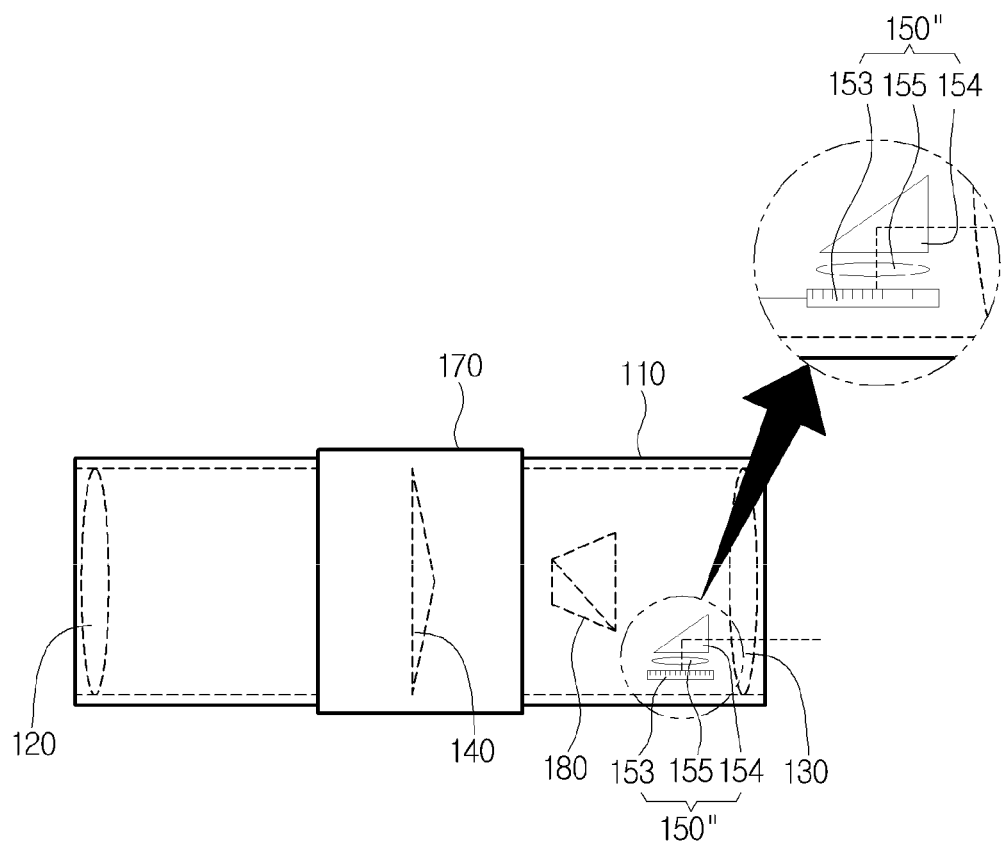

Next, the fourth alternative embodiment to the first embodiment is different from the second alternative embodiment in that a distance indicator 150" is placed inside the housing 110 as shown in FIG. 9. That is, the distance indicator 150" according to the third alternative embodiment includes a micro graduated ruler 153 marked with the gradations 151 and arranged inside the housing 110 to move in association with the image split prism 140, and a reflective prism or mirror 154 for showing an observer the gradations 151 of the graduated ruler 153. When the image split prism 140 is moved by the adjustment ring 170 in the direction of the optical axis, the micro graduated ruler 153 connected to the image split prism 140 moves together with the image split prism 140. At this time, the gradation 151 at the moved position is refracted through the reflective prism or mirror 154 and a focal distance compensation lens 155 arranged above the graduated ruler 153 and then focused on an observer's retina. Here, the focal distance compensation lens 155 is arranged in between the micro graduated ruler 153 and the reflective prism or mirror 154 in order to magnify the gradations 151 of the micro graduated ruler 153.

Thus, if an observer moves the adjustment ring 170 and thus adjusts the image split prism 140 in order to measure the distance, s/he can see the gradation 151 corresponding to the position of the image split prism 140 through the reflective prism or mirror 154, thereby checking the gradation 151 while measuring the distance.

In this case, the gradation 151 is integrally connected to the image split prism 140 and thus moves together with two images split by the image split prism 140. Thus, it is possible to easily and quickly measure the distance from the flagstick.

Figure 10:
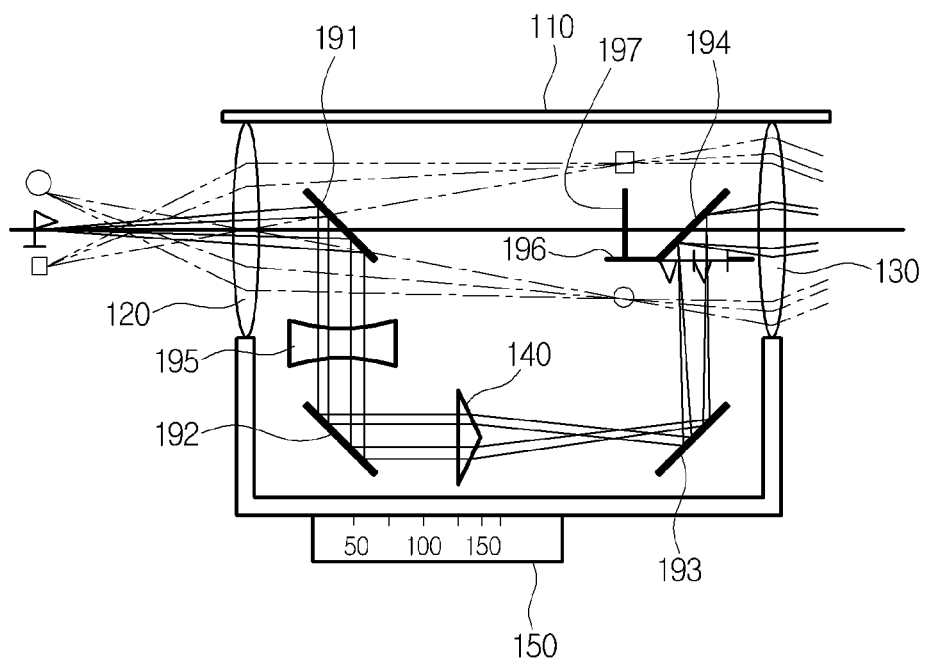

Next, according to the fifth alternative embodiment to the first embodiment, first to fourth reflective mirrors 191, 192, 193 and 194 are arranged on optical axes between the object lens 120 and the eyepiece 130 in order to refract the optical path of the image in the center region corresponding to the flagstick as shown in FIG. 10, so that the image passing through the first to fourth reflective mirrors 191, 192, 193 and 194 can enter a center region of the eyepiece 130 through the fourth reflective mirror 194.

Here, a focal distance compensation lens 195 is arranged in between the first and second reflective mirrors 191 and 192, the image split prism 140 is arranged in between the second and third reflective mirrors 192 and 193, a first aperture 196 is arranged in between the third and fourth reflective mirrors 193 and 194 so as to block out a circumferential region of the image while allowing a center region of the image to be passed, and a second aperture 197 is arranged in between the object lens 120 and the fourth reflective mirror 194 so as to block out the center region of the image.

Figure 11:
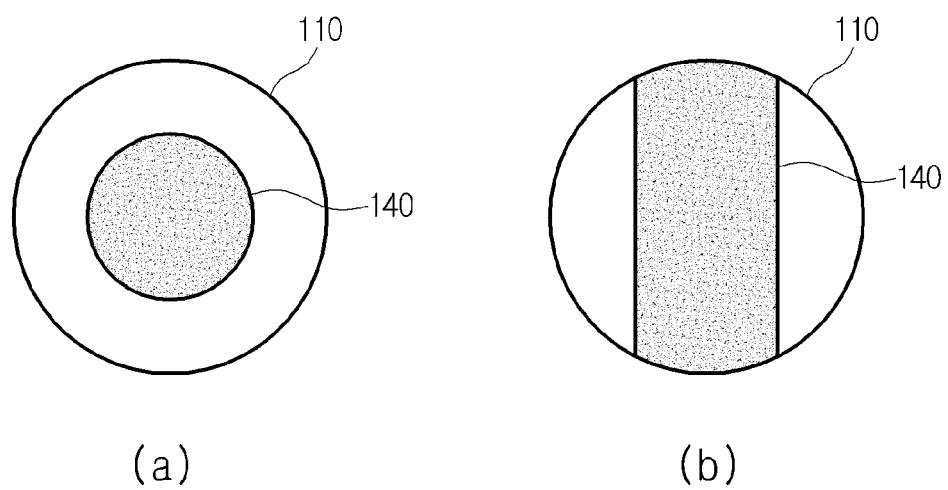
FIG. 11 shows an image seen through an eyepiece according to a fifth alternative embodiment with regard to a first embodiment of the present invention.

With this optical system, an image split into two by the image split prism 140 and seen to a user's eyes through the eyepiece 130 can be observed as one object with regard to the circumferential region and two split images with regard to the center region as shown in (a) of FIG. 11 within a telescope view, thereby easily grasping an environment surrounding the hole while obtaining the magnified image through the object lens 120.

Also, as shown in (b) of FIG. 11, the image of the flagstick may be vertically observed through the eyepiece 130 by the transformation of the first aperture 196 and the second aperture 197 and the surroundings of the hole may be observed at central opposite sides.

Meanwhile, in the foregoing embodiments, the distance indicator 150 is provided in the form of gradations, but not limited thereto. Alternatively, the distance indicator 150 may be achieved by a digital method.

Further, the sixth alternative embodiment to the first embodiment is different from the first embodiment in that, instead of using the eyepiece as the display, an imaging device is provided at a position where an image from the object lens is focused, and an image output section interlocking with the imaging device is provided in the back of the housing, so that the image can be observed through a screen.

Nest, a rangefinder with an image split prism for a golf course hole will be described according to a second embodiment of the present invention.

Figure 12:
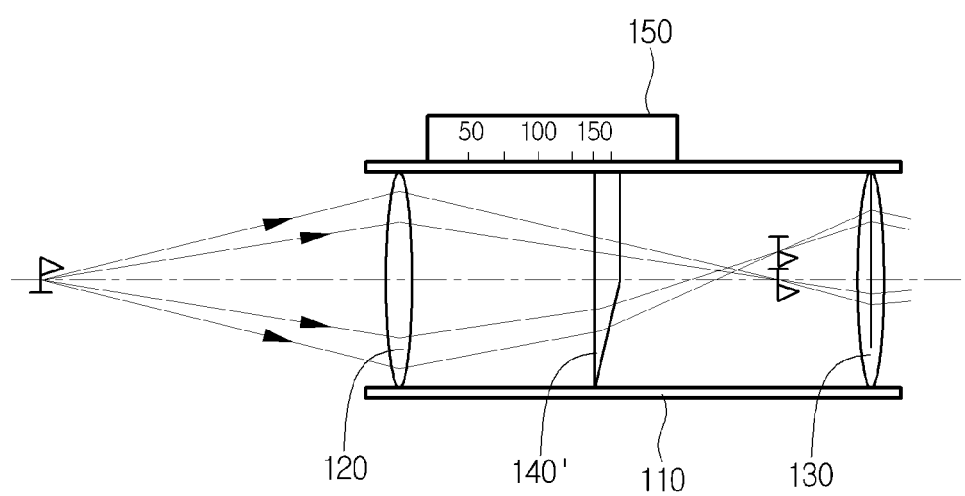
FIG. 12 is a cross-section view showing a configuration of a rangefinder with an image split prism for a golf course hole according to a second embodiment of the present invention.
Figure 13:
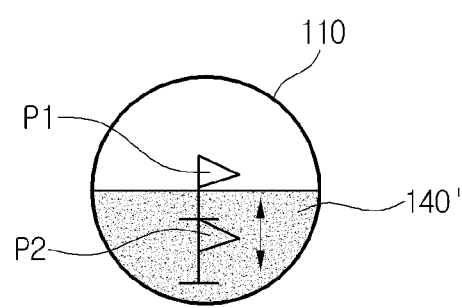
FIG. 13 is a view showing observed images corresponding to the operations of the rangefinder with the image split prism for the golf course hole according to the second embodiment of the present invention.

Among the accompanying drawings, FIG. 12 is a cross-section view showing a configuration of a rangefinder with an image split prism for a golf course hole according to a second embodiment of the present invention, and FIG. 13 is a view showing observed images corresponding to the operations of the rangefinder with the image split prism for the golf course hole according to the second embodiment of the present invention.

As shown in FIG. 12, the second embodiment of the present invention is different from those of the foregoing embodiments in that an image split prism 140' includes a modified-biprism 140' which has an incident surface formed with a flat surface and an exit surface formed with an inclined surface at a lower portion and a flat surface at an upper portion.

In the rangefinder with the image split prism 140' for the golf course hole according to the second embodiment, rays passing through the object lens 120 and the upper region of the optical axis, where the image split prism 140' has no inclined surface, are not refracted while passing through the flat surface of the image split prism 140' and thus form an image on the focal position of the object lens 120. On the other hand, rays passing through the lower region of the optical axis are refracted while passing through the inclined surface of the image split prism 140' so that the position of the image can deviate upward.

In other words, the second embodiment forms two images P1 and P2 like those of the first embodiment. However, as shown in FIG. 13, the upper image P1 is refracted by the object lens 120 and then formed, but the lower image P2 is refracted by the object lens 120 and the inclined surface of the image split prism 140' and then formed. Thus, if the image split prim 140' is moved along the optical axis for setting up the reference position based on two images P1 and P2, only the lower image P2 is moved up and down.

Accordingly, while the image split prim 140' is moved along the optical axis for setting up the reference position based on two images P1 and P2, the upper image P1 is maintained in place and only the lower image P2 is moved up and down, thereby improving a user's convenience since both two images are not moved on the contrary to the first embodiment.

Meanwhile, in this embodiment, the image split prism 140' includes the inclined surface at a lower portion on one side thereof, but not limited thereto. Alternatively, the inclined surface may be formed at an upper portion on one side of the image split prism 140' with respect to the optical axis, or may be formed at an upper or lower portion on both sides, or may be downside up.

Further, the flat surface causing no refraction is formed at an opposite portion of the optical axis on both sides, where the image split prism 140' has no inclined surface, so that the position of the image split prism 140' can be easily set up within the housing 110.

If only the half of the image split prism 140' is used with respect to the optical axis as shown in FIG. 12, there is only one vertical angle at the lower portion. Therefore, between two vertical angles $A_1$, $A_2$ of the expression 6, let the upper vertical angle $A_1=0°$, and $A_2$ is substituted by the lower vertical angle.

That is, if the gradations 151 of the distance indicator 150 is manufactured based on the expression 6, they are as shown in the following [table 2].

TABLE 2

| $S_{(m)}$ | $X_{(mm)}$ |
|---|---|
| 50 | 83.96 |
| 60 | 69.96 |
| 70 | 59.97 |
| 80 | 52.47 |
| 90 | 46.64 |
| 100 | 41.98 |
| 110 | 38.16 |
| 120 | 34.98 |
| 130 | 32.29 |
| 140 | 29.99 |
| 150 | 27.99 |
| 160 | 26.24 |

TABLE 2-continued

| $S_{(m)}$ | $X_{(mm)}$ |
|---|---|
| 170 | 24.69 |
| 180 | 23.32 |
| 190 | 22.09 |
| 200 | 20.99 |
| 210 | 19.99 |

(where, it is assumed that the height of the flagstick is y=2.2 m, the focal distance of the object lens 120 is f'=10 cm the upper vertical angle of the image split prism 140' is $A_1=0°$, the lower vertical angle of the image split prism 140' is $A_2=6°$, and the refractive index of the image split prism 140' is b=1.50).

Figure 14:
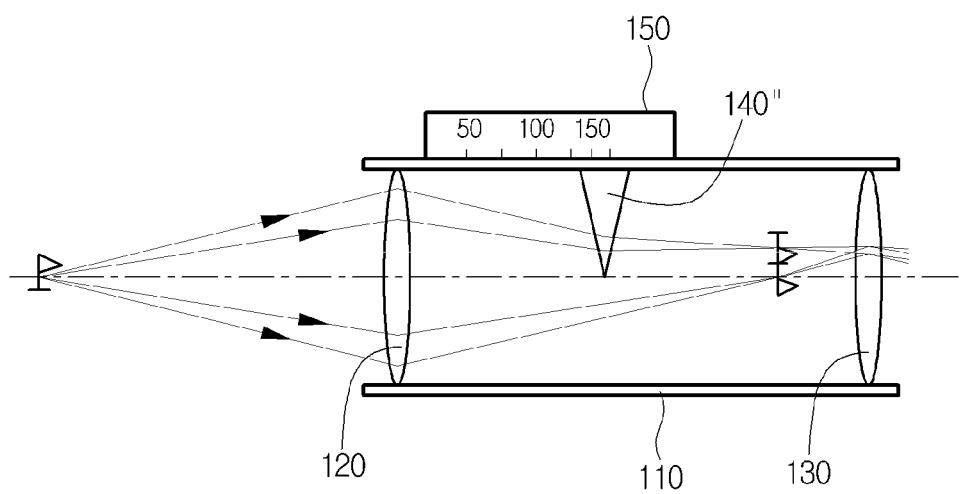
FIG. 14 is a view showing a first alternative example of the rangefinder with the image split prism for the golf course hole according to the second embodiment of the present invention.

Meanwhile, as shown in FIG. 14, according to a first alternative embodiment to the second embodiment, the image split prism 140" arranged on the optical path between the object lens 120 and the eyepiece 130 may be placed in the upper or lower portion with respect to the optical axis, and have inclined surfaces with inclines opposed to each other in forward and backward directions of the optical axis, thereby having a similar effect to that of the second embodiment.

Further, although it is not shown, the image split prism 140 of the optical system of FIG. 10 may be replaced by the foregoing image split prism 140a, 140' or and 140".

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment, there is provided a rangefinder with an image split prism for a golf course hole, in which an image split prism arranged in between an object lens and an eyepiece is used to split an image into two images, and thus the two images are moved together as if they are joined when a housing is shaken by vibration, thereby accurately measuring a distance from the flagstick even though hand vibration or the like vibration is generated.

The invention claimed is:

1. A rangefinder with an image split prism for a golf course hole, the rangefinder comprising:
    a housing shaped like a cylinder and opened frontward and backward;
    an object lens comprising one or more lenses arranged in a front end portion of the housing and facing an object targeted for distance measurement;
    a display configured to display an image from the object lens to a user;
    the image split prism arranged in between the object lens and the display, making the image from the object lens be split and focused, and installed movably along an optical axis within the housing so that a space between split images is arranged; and
    a distance indicator indicating distance from the targeted object in accordance with positions of the image split prism, wherein the positions of the image split prism are arranged to set up the space between the split images to a reference position.

2. The rangefinder according to claim 1, wherein the display comprises an eyepiece comprising one or more lenses arranged in a back end portion of the housing so that the image from the object lens can be focused on a retina.

3. The rangefinder according to claim 2, wherein the object lens or the eyepiece comprises a zoom lens.

4. The rangefinder according to claim 1, wherein the display comprises,
an imaging device located where the image from the object lens is focused, and
an image output section located in the back of the housing and configured to output an image acquired by the imaging device.

5. The rangefinder according to claim 1, wherein at least one side of the image split prism comprises inclined surfaces respectively having different inclines opposed to each other at upper and lower portions with respect to the optical axis.

6. The rangefinder according to claim 5, wherein the image split prism is spaced apart from the optical axis between the object lens and the display, and wherein the rangefinder further comprises a plurality of reflective mirrors for directing an image in a center region to penetrate the image split prism.

7. The rangefinder according to claim 1, wherein the image split prism comprises an inclined surface at an upper or lower portion on at least one side with respect to the optical axis.

8. The rangefinder according to claim 1,
wherein the image split prism comprises an upper portion and a lower portion with respect to the optical axis, when one of the upper portion and the lower portion has a flat surface on an incident side of the image split prism and an inclined surface on an exit side of the image split prism, the other of the upper portion and the lower portion has flat surfaces which cause no refraction on both the incident side and the exit side of the image split prism.

9. The rangefinder according to claim 7, wherein the image split prism is spaced apart from the optical axis between the object lens and the display, and wherein the rangefinder further comprises a plurality of reflective mirrors for directing an image in a center region to penetrate the image split prism.

10. The rangefinder according to claim 1, wherein the image split prism comprises three or more inclined surfaces formed by alternating two inclined surfaces different in incline on at least one side.

11. The rangefinder according to claim 10, wherein the image split prism is spaced apart from the optical axis between the object lens and the display, and wherein the rangefinder further comprises a plurality of reflective mirrors for directing an image in a center region to penetrate the image split prism.

12. The rangefinder according claim 1, further comprising an adjustment ring rotatably coupled to the housing and configured to move the image split prism along the optical axis.

13. The rangefinder according to claim 12, wherein gradations of the distance indicator are formed on one outer circumferential surface of contact surfaces between the housing and the adjustment ring, and a reference baseline for indicating the gradation is formed on the other circumferential surface.

14. The rangefinder according to claim 1, wherein the distance indicator comprises a micro graduated ruler marked with gradations and arranged inside the housing so as to move in association with the image split prism, a focal distance compensation lens adjacent to the micro graduated ruler, and a reflective prism or mirror arranged in between the focal distance compensation lens and the display.

15. The rangefinder according to claim 1, further comprising a reticle placed in front of the display so that two images split by the image split prism can be focused thereon.

16. The rangefinder according to claim 15, wherein the reticle is formed with a reference mark, and the display is arranged movably along the optical axis so that a user can control vision based on his/her eyesight through the reference mark.

17. The rangefinder according to claim 15, wherein the object lens is arranged movably along the optical axis so as to adjust focus of two images focused on the reticle in accordance with distances from the object targeted for distance measurement.

18. The rangefinder according to claim 1, wherein an erecting prism for erecting the image from the object lens is arranged between the object lens and the display.

19. The rangefinder according to claim 1, wherein gradations of the distance indicator corresponding to distances from the targeted object satisfy the following expression for calculating a distance from an image focusing surface to the image split prism:

$$x = \frac{yf'}{s\{|\tan(A_1(n-1)) \pm \tan(A_2(n-1))|\}}$$

wherein,
y is the height of flagstick,
s is a distance from the object lens to a flagstick,
x is a distance from the image focusing surface to the image split prism,
$A_1$ is an absolute value of an upper vertical angle of the image split prism,
$A_2$ is an absolute value of a lower vertical angle of the image split prism,
f' is a focal distance of the object lens,
n is a refractive index of the image split prism, and
± is + being selected when the upper and lower vertical angles of the image split prism are in the opposite direction, and − being selected when they are in the same direction.

* * * * *